(12) United States Patent
Chu et al.

(10) Patent No.: US 6,922,206 B2
(45) Date of Patent: Jul. 26, 2005

(54) VIDEOCONFERENCING SYSTEM WITH HORIZONTAL AND VERTICAL MICROPHONE ARRAYS

(75) Inventors: Peter L. Chu, Lexington, MA (US); Michael Kenoyer, Austin, TX (US); Richard Washington, Marble Falls, TX (US)

(73) Assignee: Polycom, Inc., Milpitas, CA (US)

( * ) Notice: Subject to any disclaimer, the term of this patent is extended or adjusted under 35 U.S.C. 154(b) by 103 days.

(21) Appl. No.: 10/414,420

(22) Filed: Apr. 15, 2003

(65) Prior Publication Data

US 2004/0032487 A1 Feb. 19, 2004

Related U.S. Application Data

(60) Provisional application No. 60/372,888, filed on Apr. 15, 2002.

(51) Int. Cl.[7] .................................................. H04N 7/14
(52) U.S. Cl. ................. 348/14.09; 348/14.01; 381/92; 381/111; 381/356; 367/119
(58) Field of Search ........................... 348/14.01–14.08, 348/211.12; 381/26, 91–93, 95, 111, 122, 355, 356, 361; 367/118, 119, 124, 127

(56) References Cited

U.S. PATENT DOCUMENTS

| | | | | |
|---|---|---|---|---|
| 5,581,620 A | * | 12/1996 | Brandstein et al. | ............ 381/92 |
| 6,393,136 B1 | * | 5/2002 | Amir et al. | ............... 348/14.01 |
| 6,731,334 B1 | * | 5/2004 | Maeng et al. | ............ 348/14.08 |

FOREIGN PATENT DOCUMENTS

JP          10021047 A  *  1/1998  ............. G06F/3/16

* cited by examiner

Primary Examiner—Wing Fu. Chan
(74) Attorney, Agent, or Firm—Wong, Cabello, Lutsch, Rutherford & Brucculeri, LLP

(57) ABSTRACT

A system and method for acoustic source location using a horizontal and vertical microphone array. Tilt sensors are provided within each array to allow full determination of the tilt of each array. Based on the acoustic source location results, an image capture device may be maneuvered to focus in the direction of the acoustic source location.

12 Claims, 8 Drawing Sheets

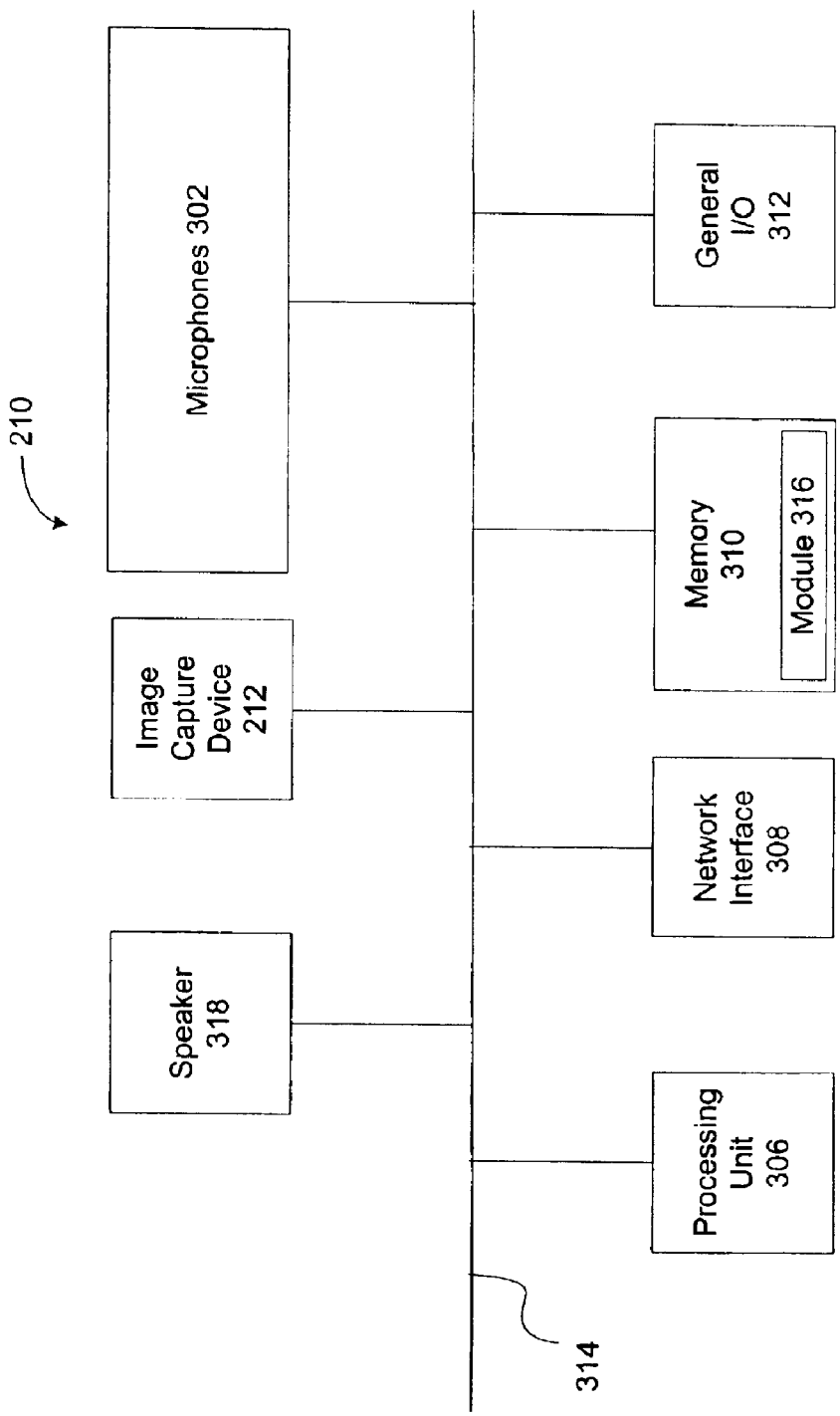

VIDEOCONFERENCING SYSTEM WITH HORIZONTAL AND VERTICAL MICROPHONE ARRAYS

CROSS-REFERENCE TO RELATED APPLICATIONS

This application claims the benefit under 35 U.S.C. § 119(e) of U.S. Provisional Patent Application Ser. No. 60/372,888 entitled "Videoconferencing System with Horizontal and Vertical Microphone Arrays" by Peter L. Chu, Michael Kenoyer and Richard Washington filed Apr. 15, 2002 which is hereby incorporated by reference. This application is related to U.S. application Ser. No. 10/414,421, entitled "System and Method for Computing a Location of an Acoustic Source," by Peter Chu, Michael Kenoyer, and Richard Washington, filed concurrently herewith, which is incorporated herein by reference.

BACKGROUND OF THE INVENTION

1. Field of the Invention

The present invention relates generally to videoconferencing systems, and more particularly to microphone arrays used in videoconferencing system.

2. Description of Related Art

Videoconferencing is rapidly becoming a popular choice of communication among corporations and individuals. Increasingly, business transactions, for example, are occurring between participants in widely different geographic locations. Since it is often difficult for all such participants to meet in a single location, many business participants rely on teleconferencing mechanisms such as videoconference systems. Videoconferencing systems are generally preferably to other teleconferencing mechanisms because these systems allow participants to view other participants, observe remote demonstrations, and more easily identify a speaking participant at any given moment. In effect, videoconferencing allows people at two or more locations to interact with each other. More importantly, information and communication is exchanged essentially in real-time.

Referring to FIG. 1A, a conventional videoconferencing system 100 is shown. The videoconferencing system 100 includes a video display 102, speakers 106, a microphone 108, and a videoconference unit 110 further comprising a camera 112. The conventional videoconferencing system 100 may be used with a personal computer or, alternatively, may have the videoconference unit 110 coupled to a large display or projection system located in a large videoconferencing room.

A disadvantage with the conventional videoconferencing system 100 is that the videoconferencing system 100 does not have the ability to focus on an individual who is speaking. The focusing process requires determination of a position of the individual, movement (i.e., panning, tilting, and zooming) of the camera 112 to the proper position of the individual, and adjustment of lenses so that the camera 112 is in focus on the individual. When more than one individual is involved in a videoconference, it may be desirable to focus the camera 112 on each individual as each individual is speaking. This focusing task is often difficult, however, because the position of the individual speaking must be determined and the camera 112 moved to that position relatively quickly and smoothly. Therefore, the videoconference systems 100 are typically left in a stationary position, and thus capture an image of the entire room or what is directly in front of the camera 112. Although there may be some videoconferencing systems 100 with the ability to pan and tilt to focus on individuals, the pan and tilt functions are usually manually controlled.

Further, some conventional videoconferencing systems 100 may have the ability to localize acoustic source. These videoconferencing systems 100 often use a vertical and horizontal microphone array to locate an acoustic source within a room. As shown in FIG. 1B, the videoconference unit 110 includes a plurality of microphones 120 arranged in a horizontal array 122 and a vertical array 124. In order to accurately determine position of the sound source, both the horizontal array 122 and vertical array 124 of microphones 120 must be used. The microphones 120 are typically placed so that distance between the microphones 120 in each array 122 and 124 is precisely known. Further, the horizontal array 122 and vertical array 124 are situated so that a relative angle between the arrays 122 and 124 is precisely known.

Typically, a processor (usually located within the videoconference unit 110) is used to determine acoustic source location. Initially, the microphones 120 detect sound, produce signals representing these sounds, and transmit these signals to the processor. The processor then uses this signal information which may include signal strength, signal time, and position of the microphones 120 to calculate an acoustic source location. Conventional methods used to determine the sound source location, such as cross-correlation techniques, are typically slow, inaccurate, and unreliable. Further, because the information cannot be processed fast enough or accurately enough, camera manipulation is not smooth and focused.

Furthermore, accuracy in determining sound source location increases with an increase in number of microphones 120 used in the horizontal array 122 and vertical array 124. Therefore, it is desirable to have as many microphones as possible positioned in both the horizontal array 122 and vertical array 124. Unfortunately, it is often not feasible or economical to have so many microphones 120.

Referring back to FIG. 1A, the conventional videoconferencing system 100 may have the horizontal and vertical arrays 122 and 124, respectively, mounted to a top section of the videoconference unit 110. Since the relative angle between the horizontal array 122 and the vertical array 124 must be precisely known in order for the camera 112 to track the acoustic source location, the horizontal array 122 and the vertical array 124 must be permanently mounted to the videoconference unit 110. This configuration has the further disadvantage of limiting the number of microphones used because increasing the number of microphones would require making the videoconference unit 110 both taller and wider. Additional a larger videoconference unit 110 structure is more difficult to set up and support on top of the video display 102, and is therefore less appealing to consumers.

Therefore, there is a need for a videoconferencing system which uses horizontal and vertical microphone arrays which may be mounted in various locations. There is a further need for a method of analyzing data from these microphone arrays which is fast and accurate enough to properly manipulate a camera.

SUMMARY OF THE INVENTION

The present invention provides a system and method for acoustic source location. Based on the acoustic source location results, an image capture device may be maneuvered to focus in a general direction of the acoustic source location. Thus, the image capture device will capture a conference participant who is talking, which allows for an improved videoconference experience.

In an exemplary embodiment of the present invention, the system comprises a central videoconference unit, a horizontal microphone array, and a vertical microphone array, each containing a plurality of audio microphones. Further, the videoconference unit may contain a speaker feedback microphone and an image capture device feedback microphone. The audio signals are received by the plurality of microphones and sent to a processing device. Subsequently, calculations are performed to determine signal time, signal strength, and microphone address data.

Further, a horizontal and vertical sensor assembly is located in the horizontal array and the vertical array. Each of these sensor assemblies may include a single-axis liquid electrolytic capacitive sensor which is used to sense a relative position of the horizontal array for the horizontal pan sensor assembly or a relative position of the vertical array for the vertical tilt sensor assembly. Additionally, each sensor assembly may comprise an analog/digital (A/D) converter to digitize the capacitive sensor output and a small IIC-based serial EEPROM. This EEPROM is used to store a pan sensor response curve and offset constants related to absolute alignment between the horizontal microphone array, a vertical microphone array, and the image capture device.

Based on all the received and calculated data, the videoconference device is able to determine an acoustic source location. Subsequently, the image capture device may be maneuvered (e.g., pan, tilt, zoom) towards the acoustic source location to capture the conference participant as he/she talks.

BRIEF DESCRIPTION OF THE DRAWINGS

FIG. 3 is a block diagram of the embodiment of FIG. 2;

DESCRIPTION OF EXEMPLARY EMBODIMENTS

Figure 2:
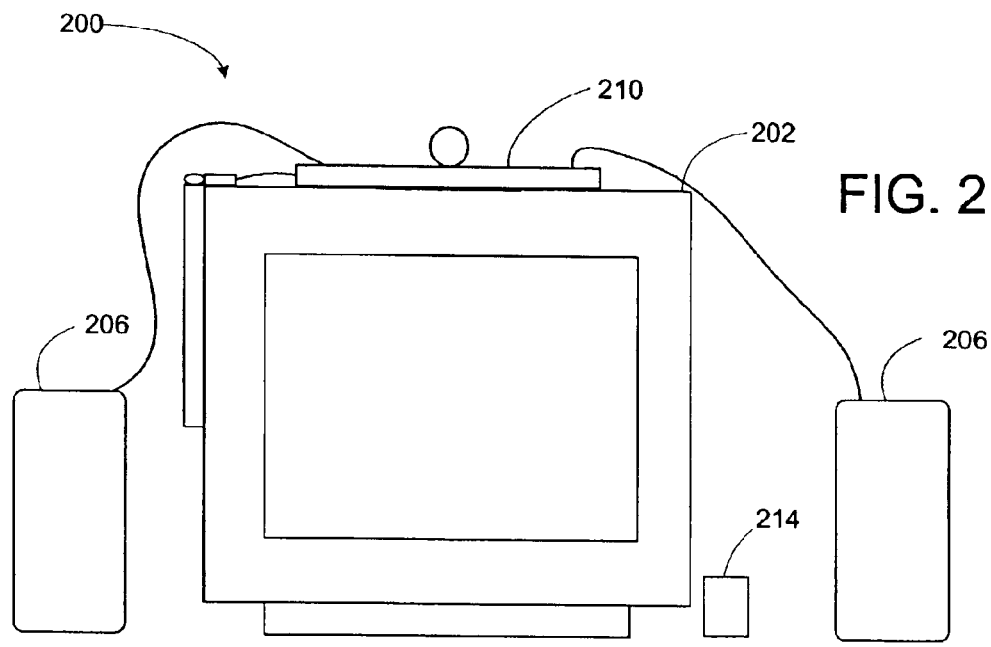
FIG. 2 is an exemplary videoconferencing system, according to the present invention.

The present invention provides a system and method which can be used to determine acoustic source location. FIG. 2 shows an exemplary embodiment of a videoconferencing system 200. The videoconferencing system 200 preferably includes a display 202, optional speakers 206, and a vertical assembly 208 coupled to a videoconference unit 210. The videoconference unit 210 and the vertical assembly 208 preferably contain microphones (not shown). Further, the videoconference unit 210, preferably, is positioned on a top of the display 202. In the embodiment of FIG. 2, the vertical assembly 208 is shown positioned on the left side of the display 202. Alternatively, the vertical body 208 may be positioned on the right side of the display 202 or any other location which allows the microphones within the vertical assembly 218 to be positioned in a vertical fashion. Furthermore, optional microphone pods 214 may be coupled to the videoconference unit 210. These microphone pods 214 may be placed on a conference table, so that sounds from a far end opposite the videoconference device 210 may be captured.

The videoconference unit 210 captures sound (via the microphones in the videoconference unit 210 and vertical assembly 208 and microphone pod 214) and images (via an image capture device 212) and transmits signals representing the sound and images to a processor preferably located in the videoconference unit 210. This image capture device (ICD) 212 may be a high resolution CMOS camera or any other camera device. Preferably, the image capture device 212 is movably mounted on a stage that includes a motor driven mechanism that pans and tilts the image capture device 212. Subsequently, the processor processes the data and may then forward the processed data to the display 202, other videoconferencing devices, and/or over a network to other videoconference participants in remote locations using video transfer protocols such as H.321.

FIG. 3 shows exemplary components of the videoconference unit 210. The videoconference unit 210 preferably includes the image capture device 212, microphones 302, a processing unit 306, a network interface 308, a memory 310, and a general input/output (I/O) 312 all coupled via a bus 314. The memory 310 may including convention memory such as SDRAM, and may store modules 316 for controlling the videoconference unit 210. Among the modules 316 are operating systems, a graphical user interface (GUI) that enables users to control the videoconference unit 210, and algorithms for processing audio/video signals as is further discussed in connection with FIGS. 7 and 8. While the network interface 308 provides communications between the videoconference unit 210 and remote devices, the general I/O 312 provides interfaces for data transmission with local devices such as a keyboard, mouse, printer, overhead projector, the display 202 (FIG. 2), the external speakers 206 (FIG. 2), etc. The videoconference unit 210 also contains an internal speaker 318.

The image capture device 212 and the microphones 302 capture images and sounds, respectively, in a videoconferencing room and produces representative video and audio signals. These signals are then transmitted via bus 314 to the processing unit 306 which processes the signals using the modules 316 stored in memory 310, as will be described in more detail with reference to FIG. 6. Subsequently, the display 202 (FIG. 2) may display the video portion of the signal while the speakers produce the corresponding sounds. Additionally, the signals may be transmitted through the network interface 308 and/or the general I/O 312 to remote locations or other devices.

According to the present inventions, sounds captured by the microphones 302 are used to determine an acoustic source location. Ideally, the processing unit 306 receives the audio signals from the microphones 302 and determines the acoustic source location with the modules 316. Once the acoustic source location is determined, a drive mechanism of the image capture device 212 is instructed by the processing unit 306 to maneuver the image capture device 212 to the direction of the acoustic source location.

Figure 4A:
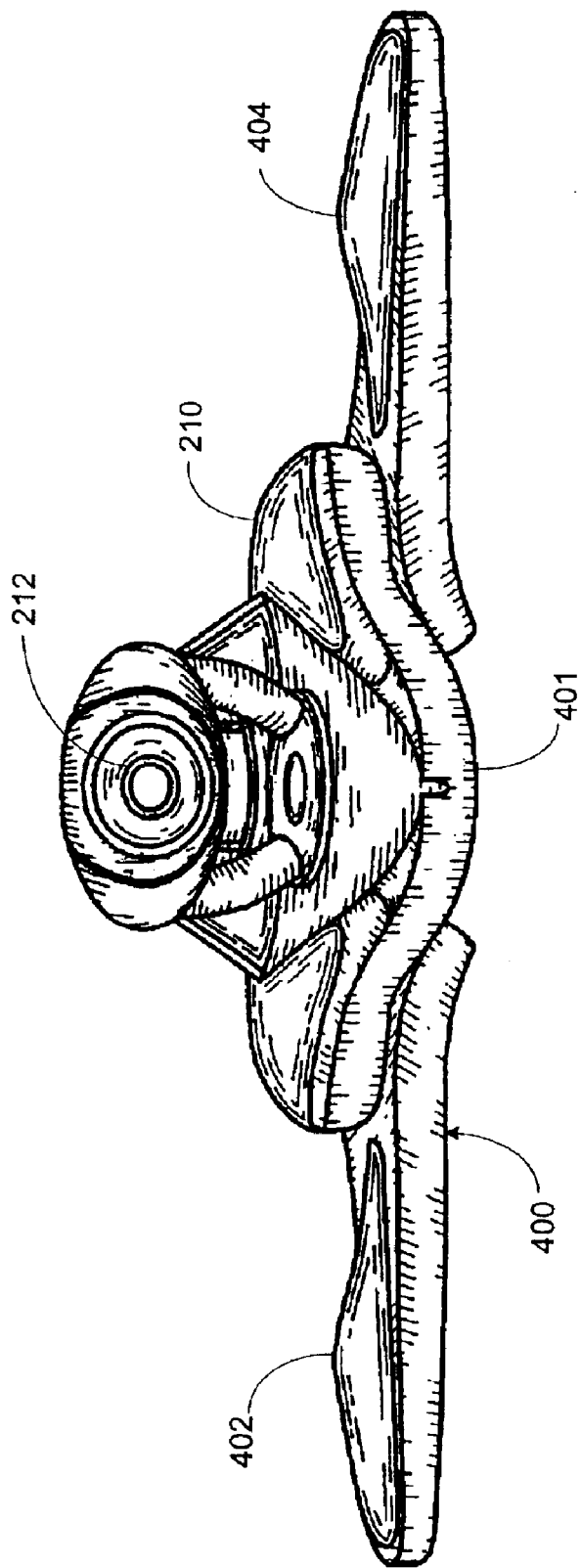
FIG. 4A is a front view of an exemplary horizontal array coupled to the videoconference unit of FIG. 3.

Referring now to FIG. 4A, an exemplary front view of a horizontal (microphone) array 400 coupled to the videoconference unit 210 central unit 401 is shown. The horizontal array 400 preferably has a left wing 402, a center section (not shown) and a right wing 404. The central unit 401 is coupled to the center section such that the left wing 402 and the right wing 404 are coupled to the left and rights sides of the central unit 401, respectively. This coupling preserves relative positions of all microphones, regardless of how the horizontal array 400 and the central unit 401 is moved.

Figure 4B:
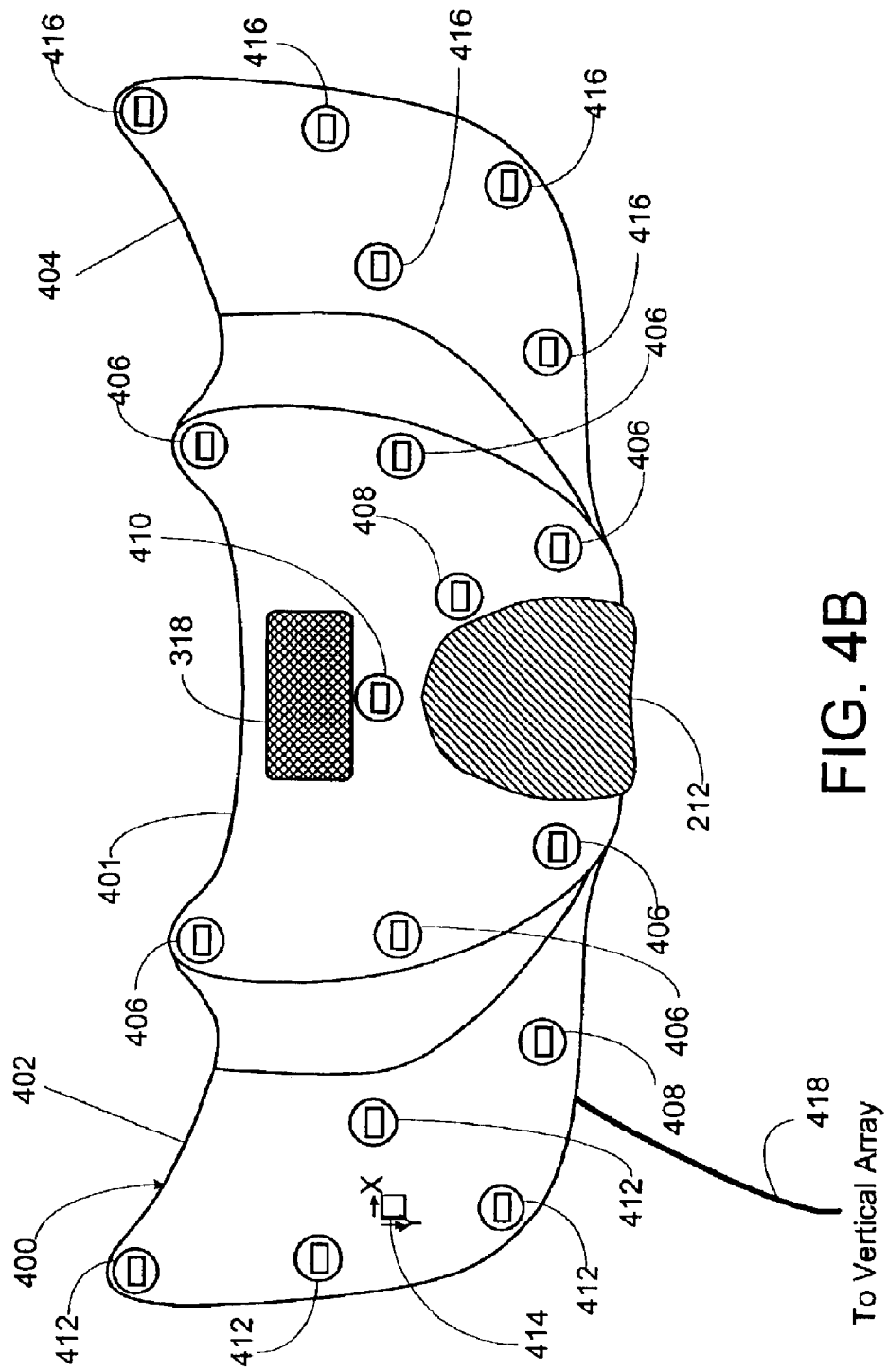
FIG. 4B is an exemplary layout of the horizontal array and videoconference unit of FIG. 4A.

Referring now to FIG. 4B, a top view layout of the horizontal array 400 coupled to the central unit 401 is illustrated. The central unit 401, as shown, contains eight microphones. Of these eight microphones, six microphones (i.e., audio microphones 406) are for detecting videoconference audio. Another microphone (i.e., image capture device (ICD) feedback microphone 408) is used to detect noise from the image capture device 212 resulting from the image capture device's 212 motions. Due to the close proximity of the image capture device 212 to the audio microphones 406, an addition of the ICD feedback microphone 408 is preferable for the proper functionality of the present invention. Finally, a microphone (i.e., speaker microphone 410) is provided for monitoring the speaker 318. Speaker monitoring by the speaker microphone 410 allows for accurate feedback from the speaker 318 even when speaker distortion is present, which is likely at higher volume levels.

The left wing 402 of the horizontal array 400 further includes a plurality of audio microphones 412 and a horizontal pan sensor assembly 414. This horizontal pan sensor assembly 414 may include a single-axis liquid electrolytic capacitive sensor which is used to sense a relative position of the horizontal array 400. Further, the horizontal pan sensor assembly 414 may comprise an analog/digital (A/D) converter to digitize the capacitive sensor output and a small IIC-based serial EEPROM. This EEPROM is used to store a pan sensor response curve and offset constants related to absolute alignment between the horizontal array 400, a vertical microphone array, and the image capture device 212.

In the exemplary embodiment of FIG. 4B where the horizontal array 400 and the central unit 401 are connected together, a horizontal pan sensor assembly is not needed in the right wing 404 if one exists in the left wing 402 and the right wing 404 has the same orientation. In an alternative embodiment where sections of horizontal array 400 are not connected in a relatively similar plane, separate horizontal pan sensor assemblies would be required in each wing.

Similarly, the right wing 404 also contains a plurality of audio microphones 416. Although the exemplary embodiment of FIG. 4B shows the left wing 402 having five audio microphones 412, the central unit 401 with six audio microphones 406, and the right wing 404 having five audio microphones 416, alternatively, any number of microphones 406, 412, and 416 may be utilized. The only criteria for the number of microphones 406, 412, and 416 used is that more microphones provide more data and therefore can provide better detection of the acoustic source.

Figure 1A:
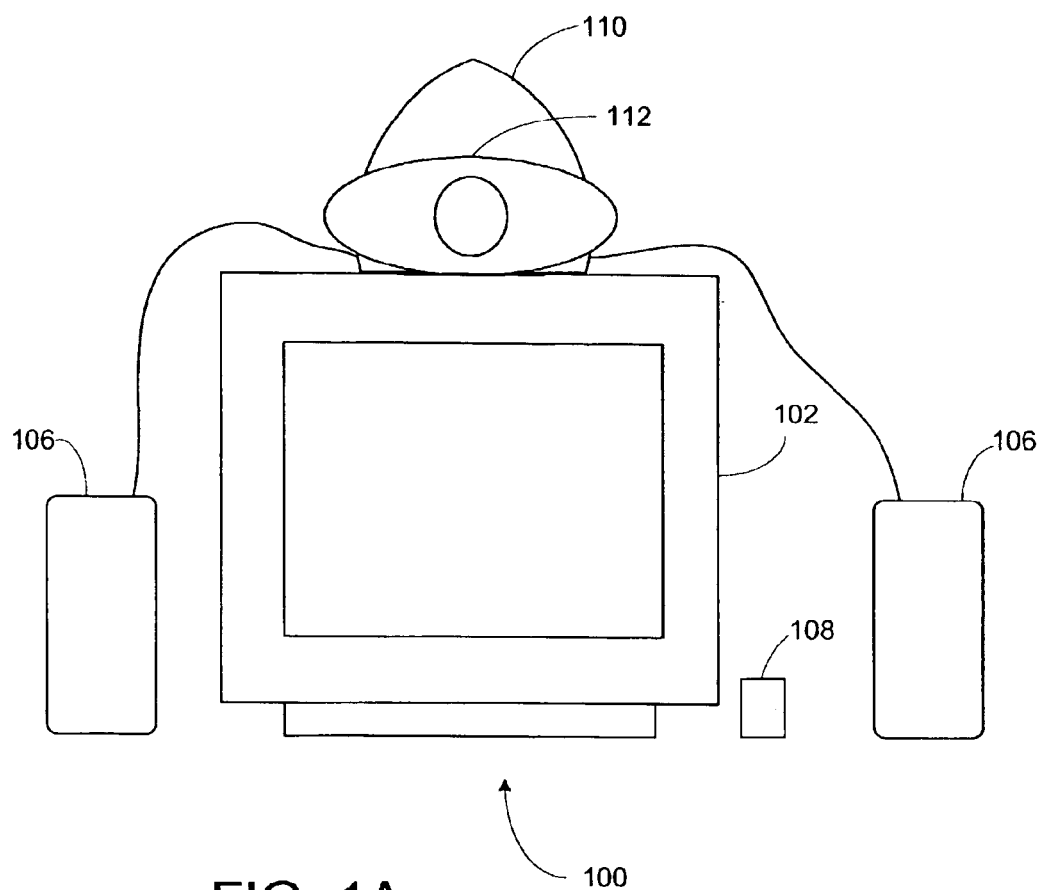
FIG. 1A is diagram of a conventional videoconferencing system.
Figure 1B:
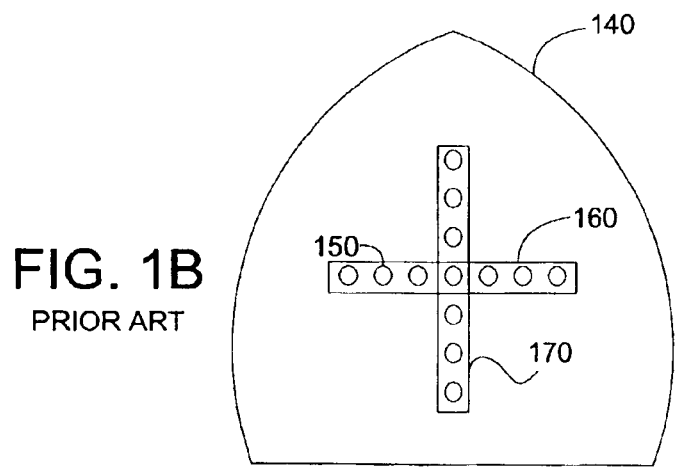
FIG. 1B is a diagram of a conventional horizontal and vertical microphone array.

The present invention is capable of full functionality using only the central unit 401. With the six audio microphones 406, the central unit 401 is able to provide adequate audio pickup for a small videoconference room (e.g., for audio sources within eight to twelve feet) without the use of microphone pods 214 (FIG. 2). However, the addition of the horizontal array 400 and the microphone pods 214 enables the videoconference device 210 (FIG. 1) to extend audio pickup to a large room environment.

Finally, the horizontal array 400 includes a cable 418 which links the horizontal array 400 to a vertical array. As will be described in more detail with reference to FIG. 6, the cable 418 allows data transmissions between the horizontal array 400 and the vertical array.

Figure 5:
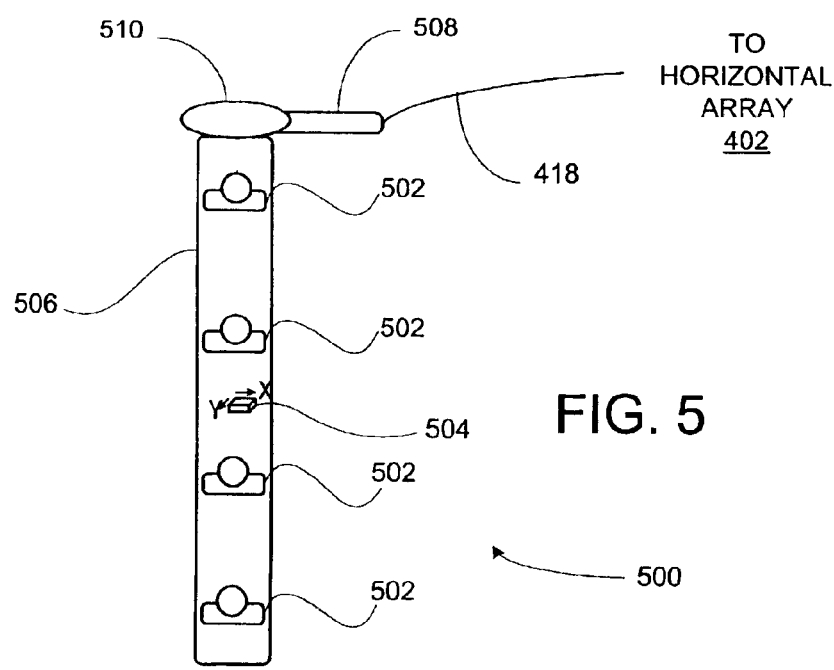
FIG. 5 is a diagram of an exemplary vertical array.

FIG. 5 is an block diagram of an exemplary vertical (microphone) array 500 having a plurality of microphones 502 and a vertical tilt sensor assembly 504 contained within a vertical body 506. As shown, the vertical body 506 is coupled to a horizontal support 508 via a pivot 510. As previously discussed with reference to FIG. 2, the vertical array 500 (embodied in the vertical assembly 208 of FIG. 2) may be positioned to extend along a left side of the video display 202 (FIG. 2) and is coupled to the left wing 402 (FIG. 4) of the horizontal array 400 (FIG. 4) through the cable 418.

In the exemplary embodiment of FIG. 5, the vertical body 506 includes four microphones 502 and the vertical tilt sensor assembly 504, which is used to determine an orientation of the vertical array 500. The vertical tilt sensor assembly 504 determines angles between the earth's gravitational field and unit vectors defining a plane of the vertical array 500 as is further discussed in connection to FIG. 7. Similar to the horizontal pan sensor assembly 414 (FIG. 4), the vertical tilt sensor assembly 504 includes a single-axis liquid electrolytic capacitive sensor which is used to sense a relative position of the vertical array 500. Further, the vertical tilt sensor assembly 504 comprises an analog/digital (A/D) converter to digitize the capacitive sensor output and a small IIC-based serial EEPROM for storing a tilt sensor response curve and offset constants related to absolute alignment between the vertical array 500 and the horizontal array 400.

The pivot 510 is a mechanical pivot that connects the vertical body 506 to the support 508. Typically, the support 508 rests on a top of a display. The pivot 510 allows the vertical body 506 to hang along the left of the display 202 (as shown in the embodiment of FIG. 2). This configuration is extremely beneficial for mounting of the vertical array 500 on a display which may not be rectangular. Further, the pivot 510 also allows the configuration to change such that the vertical body 506 may hang along a right side of the display 202.

Figure 6:
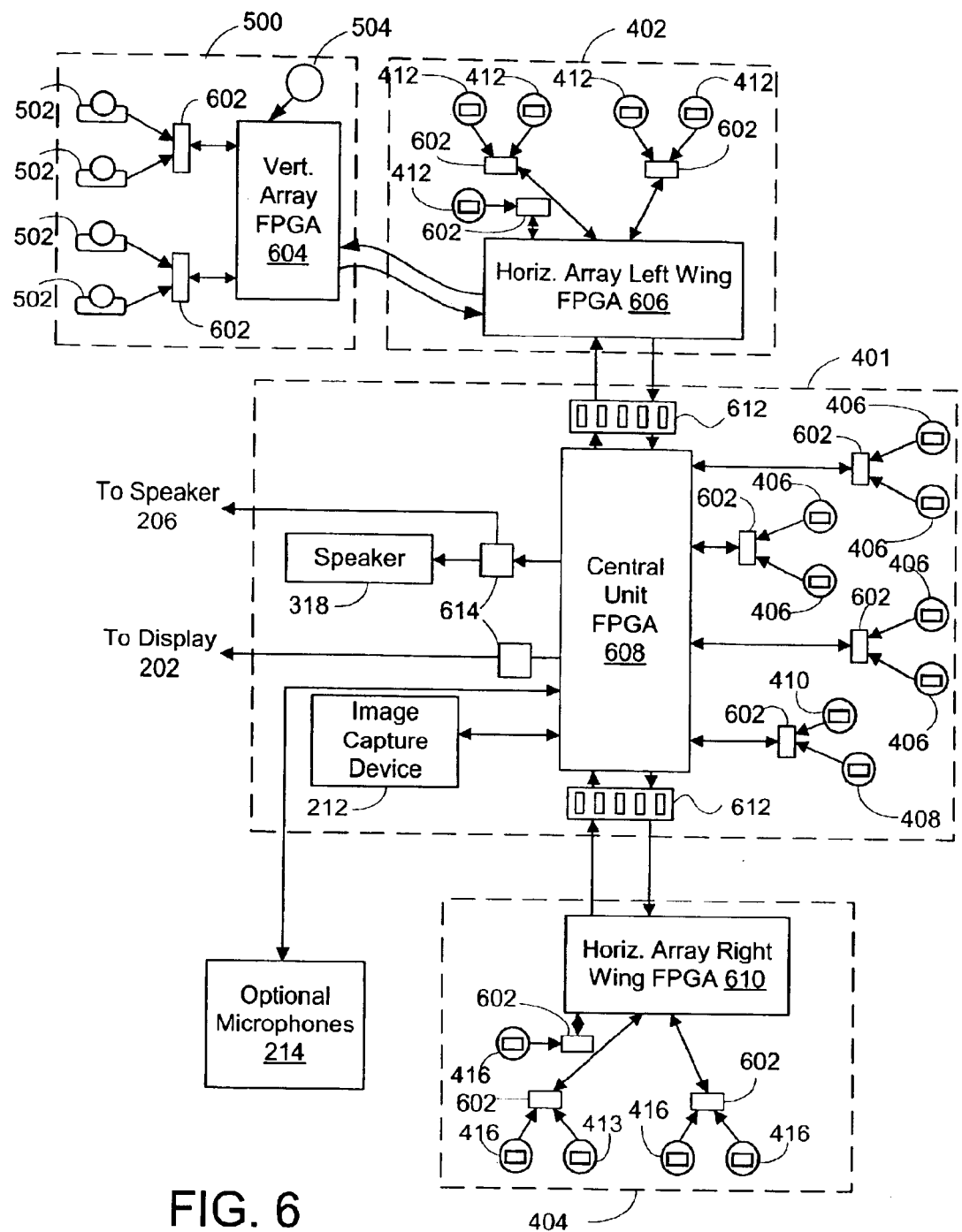
FIG. 6 is a block diagram of the horizontal and vertical array functionally coupled together.

Referring now to FIG. 6, an exemplary block diagram of a path of signals through the videoconference device 210 is shown. The block diagram illustrates details of the vertical array 500, the left wing 402, the central unit 401, and the right wing 404 and further includes the optional external microphone 214, the internal speaker 318, and the image capture device 212. Within the various components of the videoconference device 210 are microphones 406, 412, 416, and 502, a plurality of analog/digital (A/D) converters 602, a vertical field programmable gate array (FPGA) 604, a horizontal left wing FPGA 606, a central unit FGPA 608, and a horizontal right wing FPGA 610.

The various microphones 406, 412, 416, and 502 in the videoconference device 210 detect audio from videoconference participants. These audio signals are then converted into digital signals by the A/D converters 602. Due to the partition of the videoconference device 210 into the vertical array 502, horizontal left wing 402, central unit 401, and horizontal right wing 404, the A/D converters are located as close as possible to the microphones 406, 412, 416, and 502 in order to reduce noise pickup amounts. The A/D converters 602 permit data from two or more microphones 406, 412, 416, and 502 to share a common transmission medium. Once converted, the digital signals are sent to a processor. In an exemplary embodiment, the left wing 402, the central unit 401, the right wing 404, and the vertical body 506 each may have a separate processor in the form of the FPGA, which are involved with collecting audio data and control of various A/D converters 602 and digital/analog (D/A) converters.

The vertical FPGA 604 preferably exchanges data with the A/D converters 602 located in the vertical array 500 and the vertical pan sensor assembly 504. Additional, the vertical FPGA 604 generates data containing not only microphone data and vertical pan sensor assembly data, but also signal time data and microphone address data. The vertical FPGA 604 then transmits this data to the central unit FPGA 608 through the left wing FPGA 606. The transmission rate between the different FPGAs is typically 8.2. MHz, although other rates are contemplated.

The horizontal left wing FPGA 606 not only exchanges data with the A/D converters 602 located in the left wing 402 and the horizontal pan sensor assembly 414, but also with the vertical FPGA 604, acting as a conduit for data from the vertical FPGA 604. Further, the horizontal left wing FPGA 606 generates data containing microphone data, horizontal pan sensor assembly data, signal time data, and microphone address data. Similarly, the horizontal right wing FPGA 610 generates data containing microphone data, signal time data, and microphone address data. Both the horizontal left wing FPGA 606 and the horizontal right wing FPGA 610 transmit data directly to the central unit FPGA 608 via connectors 612.

The central unit FPGA 608 exchanges data with the A/D converters 602 located in the central unit 401, the horizontal left wing FPGA 606, the horizontal right wing FPGA 610, the internal speaker 318, the optional microphones 214, the external speakers 206 (FIG. 2), the image capture device 212, and to the display 202 (FIG. 2). Alternatively, the central unit FPGA 608 may exchange data with the processing unit 306 (FIG. 3), the network interface 310 (FIG. 3), and other devices through the general I/O 312 (FIG. 3). Typically, the data is converted back into analog signals by D/A converters 614 before transfer of the data to the various display and speaker devices.

The central unit FPGA 608 further uses data received from the A/D converters 602, the horizontal left wing FPGA 606, which includes data from the vertical microphone array 604, and the horizontal right wing FPGA 610 to determine an acoustic source location and to command the image device 212 to maneuver in a direction of the acoustic source. The central unit FPGA 608 receives data that includes signal strength data and time data for each microphone as well as horizontal and vertical pan sensor assembly data and temperature data, and calculates the acoustic source location using this data. Calculation methods will be described in further details with reference to FIG. 8. Once the acoustic source location is determined, the central unit FPGA 608 commands a motorized stage coupled to the image capture device 212 to point in the direction of the acoustic source. The images captured by the image capture device 212 may be then be displayed on the display 202, transmitted to a remote videoconference participant through the network interface 308, forwarded to other local devices via the general I/O 312, or any combination of these.

In the embodiment of FIG. 6, the central unit FPGA 608 may also receive via the network interface 308 and process audio and video signals from remote conference sites, or signals from other local devices such as a VCR or personal computer. The audio signals are typically split such that the appropriate signals are sent to the optional internal speaker 318 and the external speakers 206. Simultaneously, the video signals are transmitted to the display 202 (FIG. 2) or other viewing devices via the general I/O 312 (FIG. 3).

Figure 7:
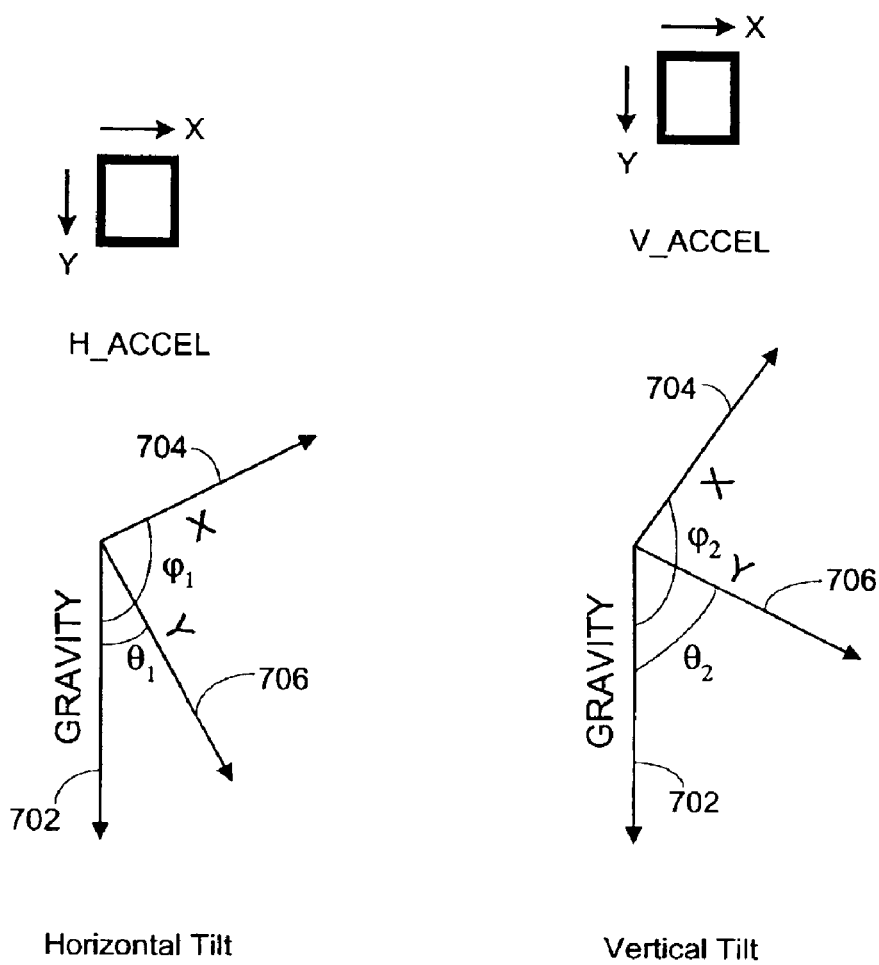
FIG. 7 is a vector diagram of angles calculated with an accelerometer.

FIG. 7 is a vector diagram illustrating angles calculated by the horizontal pan sensor assembly 414 (FIG. 4) including a gravity vector 702 pointing in a direction of gravity, a first x-axis vector 704, a first y-axis vector 706, an angle $\phi_1$ between gravity vector 702 and the first x-axis vector 704, and an angle $\theta_1$ between the gravity vector 702 and the first y-axis vector 706. By determining the angles $\phi_1$ and $\theta_1$, the horizontal pan sensor assembly 414 is able to determine the horizontal pan sensor assembly's 414 orientation with respect to gravity. A similar process is used to determine the vertical tilt sensor assembly 506 (FIG. 5) orientation.

Since the horizontal and vertical sensor assemblies 414 and 506 are securely mounted to the horizontal array 400 (FIG. 4) and the vertical array 500 (FIG. 5), respectively, the orientation with respect to gravity of both the horizontal and vertical arrays 400 and 500 is determined by their respective sensor assembly 414 and 506. Since both orientations are measured relative to a fixed reference gravity, the horizontal and vertical arrays' 400 and 500 orientations are therefore also determined by the sensor assembly 414 and 506 readings. The central unit FPGA 608 (FIG. 6) uses this data to determine the acoustic source location, and to pan and tilt the image capture device 212 (FIG. 2) towards the acoustic source location. Since sensor assemblies 414 and 506 are typically temperature sensitive, a thermometer may be placed near each sensor assembly 414 and 506 to measure the temperature and supply this temperature data to the central unit FPGA 608 so that the image capture devices 212 controls can be adjusted accordingly.

Since orientations of both the horizontal array 400 and the vertical array 500 can be measured relative to a fixed reference (e.g., the earth's gravitational field), precise alignment of the horizontal array 400 and the vertical array 500 is not necessary. In contrast, conventional videoconferencing systems require a horizontal and vertical microphone array assembled into one fixed structure as shown and described in connection with FIG. 1B, so that the relative angle between the horizontal and vertical microphone arrays is always known. In the preferred embodiment it is assumed that the vertical array 500 and horizontal array 400 are located as shown in FIG. 2. A predefined horizontal distance between the vertical array 500 and the horizontal array 400 is used to simplify installation. This predefined distance in this case is considered to provide satisfactory resolution, the vertical orientation of the vertical array 500 and the horizontal orientation of the horizontal array 400 being more critical to minimizing location errors. If more accuracy is desired the distance between the vertical array 500 and the horizontal array 400 can be determined and used in the location calculations.

Figure 8:
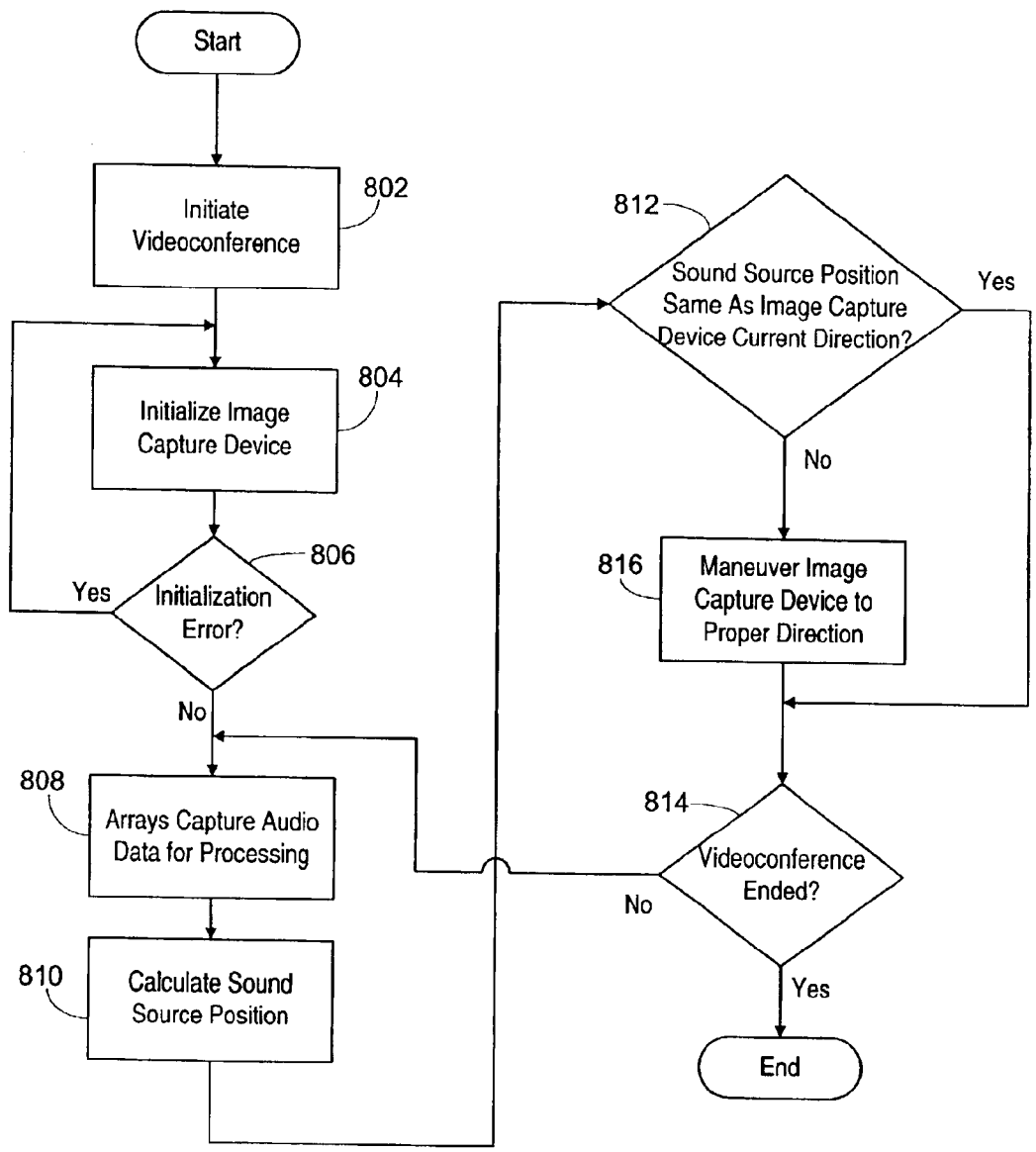
FIG. 8 is a flowchart of a method for processing incoming signals from the horizontal and vertical microphone arrays in order to control a camera.

FIG. 8 is a flowchart 800 showing an exemplary method for controlling the image capture device 212 (FIG. 2). Initially in block 802, a videoconference is initiated. Next in block 804, a stage holding the image capture device 212 is initialized by moving the stage to a home position and setting the stage coordinates to known coordinates of the home position. For example, the home position may be with the image capture device 212 pointed directly ahead. Checks are then performed in block 806 to determine if any errors have occurred during the initialization of the image capture device 212. These checks include verifying that the coordinates of the stage and image capture device 212 in the home position are within a small error of the expected home position. If an error has occurred in block 806, then the method returns to initializing the image capture device 212.

Alternatively, if no error is detected, then the horizontal array 400 (FIG. 4) and vertical array 500 (FIG. 5) capture audio data and forward the audio data to a processing unit (e.g., the FPGA 608 or the processing unit 306 (FIG. 3)) for analysis in block 808. Data captured includes audio data, time data, and sensor assembly 414 (FIG. 4) and 506 (FIG. 5) data used to determine relative orientations between the horizontal array 400 and the vertical array 500. This data is analyzed in block 810 to determine a acoustic source location. Preferably the analysis is done as described in U.S. patent application Ser. No. 10/414,421, "System and Method for Computing a Location of an Acoustic Source" incorporated by reference above, but other methods may also be used.

Next in block 812, the videoconference device 210 must determine if the acoustic source location is in the same proximity as the image capture device's 212 current direction. The pan and tilt angles from the horizontal pan sensor assembly 414 and the vertical tilt sensor assembly 504 are used to correct the zero reference location of the image capture device 212 to compensate for pan and tilt of the central unit 401. If the image capture device 212 is pointed at the acoustic source location, then the videoconference device 210 determines if the videoconference has ended in block 814. Should the videoconference continue, then the process is repeated and a new set of audio data is captured and processed to determine if there is a new acoustic source location.

Alternatively, if in block 812 the acoustic source location is not in the current direction of the image capture device 212, then commands necessary for maneuvering the image capture device 212 to the proper direction are determined in block 816. Typically, the commands are arrived at by calculating a voltage form 0 to 5 Volts which will be interpreted by the motorized stage coupled to the image capture device 212 as an amount by which to move. This voltage is then transmitted to the motorized stage causing the stage and, consequently, the image capture device 212 to move to the proper direction and position. Once the image capture device 212 is in the correct direction, then the videoconference device 210 determines in block 814 if the videoconference has ended. If the videoconference has not ended, then the process is repeated.

Thus a system according to the present invention provides flexible mounting of horizontal and vertical arrays of microphones, with information provided to allow the locations to be accurately determined so that a good acoustic source location can be developed and used to accurately manipulate the camera.

It will be recognized by those skilled in the art that while the invention has been described in terms of exemplary embodiments, it is not limited thereto. Various features and aspects of the above-described invention may be used individually or jointly. Further, although the invention has been described in the context of its implementation in a particular environment for particular applications, those skilled in the art will recognize that its usefulness is not limited thereto and that the present invention can be utilized in any number of environments and implements.

What is claimed is:

1. A videoconference system comprising:
   a horizontal microphone array providing an output for each microphone;
   a vertical microphone array providing an output for each microphone, said horizontal and vertical arrays capable of being positioned independently of each other;
   logic receiving the microphone outputs of the horizontal and vertical arrays and determining the location of an acoustic source;
   a controllable image capture device; and
   a controller connected to said logic and said image capture device for directing said image capture device to aim at the determined acoustic source location wherein said horizontal array and said vertical array each include an orientation sensor with an output, and wherein said logic uses said orientation sensor outputs to determine the location of the acoustic source.

2. The system of claim 1, further comprising:
   a microphone located adjacent said image capture device.

3. The system of claim 1, wherein said logic comprises a gate array.

4. The system of claim 3, wherein said gate array is programmable.

5. The system of claim 1, wherein said logic includes a processor and a program to control said processor to determine the location of the acoustic source.

6. The system of claim 5, wherein said controller includes said processor and a program to control said image capture device.

7. The system of claim 1, wherein said horizontal array includes a plurality of microphones arranged in two dimensions.

8. The system of claim 7, wherein said horizontal array includes two separate modules, each including a plurality of microphones arrayed in two dimensions.

9. The system of claim 1, further comprising:
   a speaker; and
   a microphone located adjacent said speaker.

10. The system of claim 9, further comprising:
    a microphone located adjacent said image capture device.

11. A method for image capture device tracking comprising:
    receiving an audio signal with a horizontal microphone array and a vertical microphone array and providing microphone out signals, the horizontal and vertical arrays capable of being positioned independently of each other;
    analyzing the microphone output signals from the horizontal and vertical arrays and determining the acoustic source location;
    maneuvering an image capture device to aim in the direction of the acoustic source location; and
    determining the orientations of the horizontal and vertical arrays, wherein the orientations are used in determining the acoustic source location.

12. The method of claim 11, wherein the horizontal array includes a plurality of microphones arranged in two dimensions.

* * * * *